United States Patent
Zhang et al.

(10) Patent No.: US 12,034,169 B2
(45) Date of Patent: Jul. 9, 2024

(54) BATTERY AND ELECTRONIC DEVICE

(71) Applicant: Zhuhai CosMX Battery Co., Ltd., Zhuhai (CN)

(72) Inventors: Hui Zhang, Zhuhai (CN); Ning Peng, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 0 days.

(21) Appl. No.: 18/335,464

(22) Filed: Jun. 15, 2023

(65) Prior Publication Data

US 2023/0327242 A1  Oct. 12, 2023

Related U.S. Application Data

(63) Continuation of application No. 18/066,166, filed on Dec. 14, 2022, now abandoned.

(30) Foreign Application Priority Data

Dec. 22, 2021 (CN) .......................... 202123276813.8

(51) Int. Cl.
*H01M 50/109* (2021.01)
*H01M 10/0587* (2010.01)
*H01M 50/119* (2021.01)
*H01M 50/153* (2021.01)
*H01M 50/184* (2021.01)

(52) U.S. Cl.
CPC ..... *H01M 50/109* (2021.01); *H01M 10/0587* (2013.01); *H01M 50/119* (2021.01); *H01M 50/153* (2021.01); *H01M 50/184* (2021.01)

(58) Field of Classification Search
CPC ........... H01M 10/0587; H01M 50/109; H01M 50/184
See application file for complete search history.

(56) References Cited

U.S. PATENT DOCUMENTS

| | | | |
|---|---|---|---|
| 2021/0104710 A1* | 4/2021 | Watanabe | H01M 50/184 |
| 2021/0384576 A1* | 12/2021 | Peng | H01M 50/153 |
| 2023/0106855 A1* | 4/2023 | Xie | H01M 50/109 |
| | | | 429/164 |

FOREIGN PATENT DOCUMENTS

| | | | | |
|---|---|---|---|---|
| CN | 213304244 U | * | 5/2021 | ........ H01M 10/0427 |
| CN | 113707982 A | * | 11/2021 | |
| CN | 113826250 A | * | 12/2021 | |
| CN | 219759760 U | * | 9/2023 | |
| WO | WO-2021033943 A1 | * | 2/2021 | ........ H01M 10/0427 |
| WO | WO-2021244618 A1 | * | 12/2021 | |

* cited by examiner

*Primary Examiner* — Amanda C. Walke

(57) ABSTRACT

The present disclosure provides a battery and an electronic device, which relate to the technical field of batteries and are used for solving the technical problem of poor sealing performance of batteries. The battery includes a shell, a cover assembly and a coiled core assembly located inside the shell; the shell is provided with an opening, and the cover assembly sealingly covers the opening; the cover assembly includes a conductive member, a top cover and a sealing member between the conductive member and the top cover; the conductive member electrically contacts the coiled core assembly; the sealing member is provided with a first through hole, the top cover is provided with a second through hole, and a diameter of the first through hole is smaller than that of the second through hole.

13 Claims, 6 Drawing Sheets

BATTERY AND ELECTRONIC DEVICE

CROSS-REFERENCE TO RELATED APPLICATION

This application is a continuation of U.S. patent application Ser. No. 18/066,166, filed on Dec. 14, 2022, which claims priority to Chinese Patent Application No. 2021232768138, filed on Dec. 22, 2021. Both of the aforementioned patent applications are hereby incorporated by reference in their entireties.

TECHNICAL FIELD

The present disclosure relates to the technical field of batteries, in particular to a battery and an electronic device.

BACKGROUND

Button battery refers to a battery with a size like a button, and generally has a large diameter and a thin thickness. Due to small size, button battery has been widely used in a variety of micro-electronic devices, such as wearable electronic devices, medical products and other fields.

In related technology, a button battery consists of a top cover assembly, a shell, and a coiled core located inside the shell. The top cover generally includes an aluminum boss, a ring upper cover and a sealing insulation adhesive between the aluminum boss and the ring upper cover, where the ring upper cover and the shell are connected together by laser welding.

Because the interior of the button battery is a sealed space, the sealing performance of the button battery is extremely important. However, button batteries in prior art have a poor sealing performance.

SUMMARY

In view of the above problem, embodiments of the present disclosure provide a battery and an electronic device, which are used to improve the sealing performance of the battery.

In order to achieve the above object, embodiments of the present disclosure provide the following technical solutions.

In a first aspect, an embodiment of the present disclosure provides a battery, at least including: a shell, a cover assembly and a coiled core assembly located inside the shell, where the shell is provided with an opening, and the cover assembly is sealingly covered on the opening; the cover assembly includes a conductive member, a top cover and a sealing member between the conductive member and the top cover; the conductive member electrically contacts the coiled core assembly; the sealing member is provided with a first through hole, the top cover is provided with a second through hole, and a diameter of the first through hole is smaller than a diameter of the second through hole.

In an optional embodiment, an outer diameter of the sealing member is smaller than an outer diameter of the conductive member.

In an optional embodiment, a surface of the conductive member facing the coiled core assembly has a boss, and the boss passes through the first through hole and the second through hole to electrically contact the coiled core assembly.

In an optional embodiment, the shell includes a bottom shell and a side shell connected with the bottom shell; the bottom shell and the side shell form an accommodating cavity for accommodating the coiled core assembly, and the opening is communicated with the accommodating cavity; and the opening is located at an end of the side shell facing away from the bottom shell, and the top cover sealingly covers the opening.

In an optional embodiment, the conductive member includes a first flat plate portion and a first convex portion connected with the first flat plate portion; the first convex portion is provided with a third through hole, and the third through hole is communicated with the accommodating cavity; where the first convex portion is used as the boss.

In an optional embodiment, a concave portion is formed on a surface of the first convex portion facing away from the coiled core assembly; the battery further includes a blocking member; the blocking member is arranged in the concave portion and used to block the third through hole.

In an optional embodiment, the conductive member includes a second flat plate portion and a second convex portion connected with the second flat plate portion; where the second convex portion is used as the boss.

In an optional embodiment, a difference between the diameter of the first through hole and the diameter of the second through hole is 0.05-0.4 mm.

In an optional embodiment, a difference between the outer diameter of the sealing member and the outer diameter of the conductive member is 0.05-0.4 mm.

In an optional embodiment, a thickness of the sealing member is 0.05-0.20 mm; and a difference between the outer diameter of the sealing member and the diameter of the first through hole is greater than or equal to 20 mm.

In a second aspect, an embodiment of the present disclosure provides an electronic device, including an electronic device body and the battery according to the first aspect, and the battery provides electric energy for the electronic device body.

The battery and the electronic device provided by the embodiments of the present disclosure have the following advantages:

in the battery provided by the embodiments of the present disclosure, the cover assembly of the battery includes a conductive member, a top cover and a sealing member between the conductive member and the top cover; the conductive member electrically contacts the coiled core assembly; the sealing member is provided with a first through hole, the top cover is provided with a second through hole, and a diameter of the first through hole on the sealing member is smaller than that of the second through hole on the top cover. In this way, one end of the sealing member close to the conductive member is located in a gap between the top cover and the conductive member, so that an inner ring of the top cover overflows with adhesive, which can improve the sealing performance between the top cover and the conductive member and the sealing performance between the top cover and the shell, thereby reducing the risk of electrolyte penetrating and corroding the top cover and the conductive member through a sealing gap or hole, and thus reducing the risk of sealing failure between the cover assembly and the shell. Therefore, the embodiments of the present disclosure can improve the overall sealing performance of the battery. In addition, the overflowed adhesive is located in the gap between the top cover and the conductive member, so that the surface flatness and the overall aesthetics of the battery can be improved.

In addition to the technical problem solved by the above-described embodiments of the present disclosure, the technical features constituting the technical solution and the beneficial effects brought by the technical features of the technical solution, other technical problems solved by the battery and electronic device provided by the embodiments of the present disclosure, other technical features included in the technical solution and the beneficial effects brought by these technical features will be further explained in detail in the specific embodiments.

BRIEF DESCRIPTION OF DRAWINGS

In order to more clearly explain the technical solution in the embodiments of the present disclosure or in the prior art, the following will briefly introduce the drawings used in the description of the embodiments or the prior art. Obviously, the drawings in the following description are some embodiments of the present disclosure. For those with ordinary skills in the art, other drawings can be obtained according to these drawings without any creative labor.

DESCRIPTION OF REFERENCE NUMERALS

Figure 1:
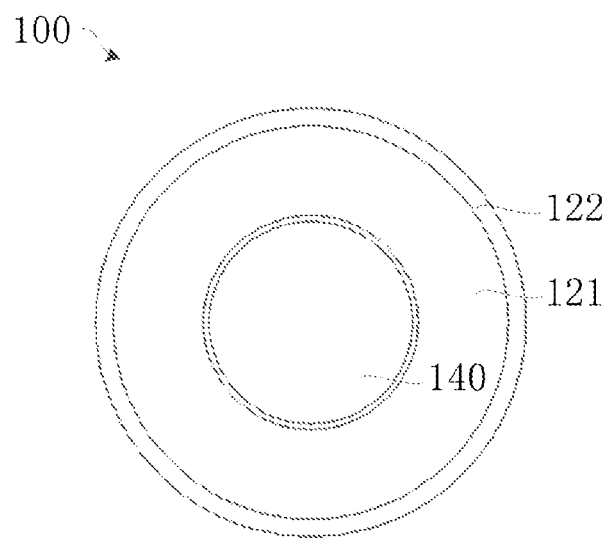
FIG. 1 is a schematic structure diagram of a battery provided by Embodiment 1 of the present disclosure.

100—battery;
110—shell;
111—bottom shell;
112—side shell;
1121—opening;
120—cover assembly;
121—conductive member;
1211—first flat plate portion;
1212—first convex portion;
1213—third through hole;
1214—concave portion;
1215—second flat plate portion;
1216—second convex portion;
122—top cover;
1221—second through hole;
123—sealing member;
1231—first through hole;
12→-gap;
130—coiled core assembly; and
140—blocking member.

DESCRIPTION OF EMBODIMENTS

Button battery, also known as button battery, refers to a battery with a size like a small button. Generally speaking, the button battery has a large diameter and a thin thickness. Due to small size, button battery has been widely used in a variety of micro-electronic products, such as wearable devices: wireless headphones, sports watches, bracelets, rings and other electronic products.

In related technology, a button battery consists of a top cover assembly, a shell, and a coiled core located inside the shell. The top cover generally includes an aluminum boss, a ring upper cover and a sealing insulation adhesive between the aluminum boss and the ring upper cover, where the ring upper cover and the shell are connected together by laser welding.

Because the interior of the button battery is a sealed space, the sealing performance of the button battery is extremely important. However, button batteries in prior art have a poor sealing performance.

In order to solve the above problem, in the battery provided by the embodiment of the present disclosure, the cover assembly of the battery includes a conductive member, a top cover and a sealing member between the conductive member and the top cover; the conductive member electrically contacts the coiled core assembly; the sealing member is provided with a first through hole, the top cover is provided with a second through hole, and a diameter of the first through hole on the sealing member is smaller than that of the second through hole on the top cover. In this way, one end of the sealing member close to the conductive member is located in the gap between the top cover and the conductive member, so that the inner ring of the top cover overflows with adhesive, which can improve the sealing performance between the top cover and the conductive member and the sealing performance between the top cover and the shell, thereby reducing the risk of electrolyte penetrating and corroding the top cover and the conductive member through the sealing gap or hole, and thus reducing the risk of sealing failure between the cover assembly and the shell. Therefore, the embodiment of the present disclosure can improve the overall sealing performance of the battery. In addition, the overflowed adhesive is located in the gap between the top cover and the conductive member, so that the surface flatness and the overall aesthetics of the battery can be improved.

In order to make the above purposes, features and advantages of the embodiment of the present disclosure more obvious and understandable, the technical solution in the embodiments of the present disclosure will be described clearly and completely in combination with the accompanying drawings in the embodiments of the present disclosure. Obviously, the described embodiments are only part of the embodiments of the present disclosure, but not all embodiments. Based on the embodiments in the disclosure, all other embodiments obtained by those ordinary skilled in the art without creative labor are within the scope of protection of the present disclosure.

Embodiment 1

Figure 2:
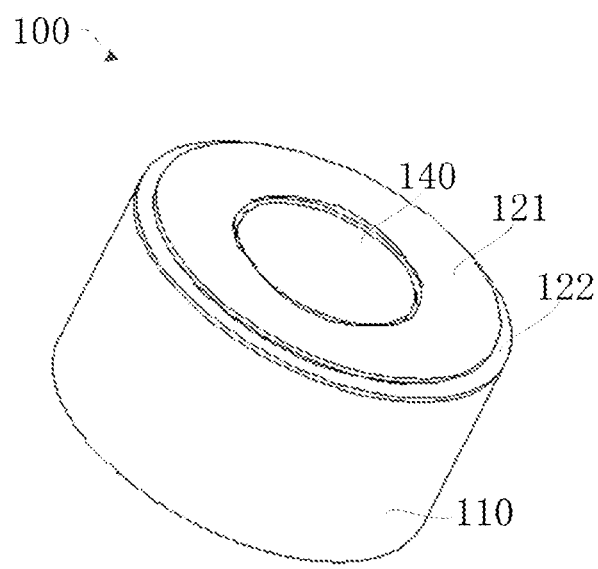
FIG. 2 is another schematic structure diagram of the battery provided by Embodiment 1 of the present disclosure.
Figure 3:
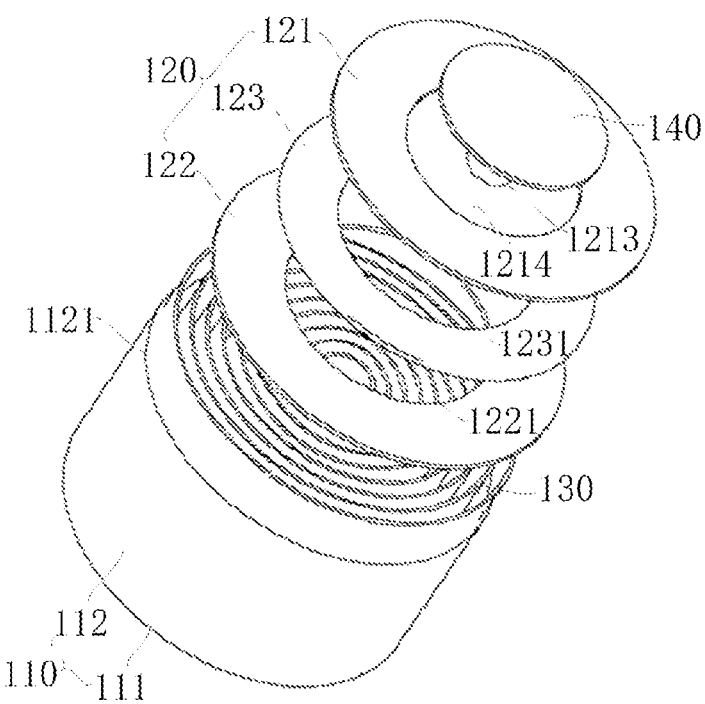
FIG. 3 is a schematic structure exploded diagram of the battery provided by Embodiment 1 of the present disclosure.
Figure 4:
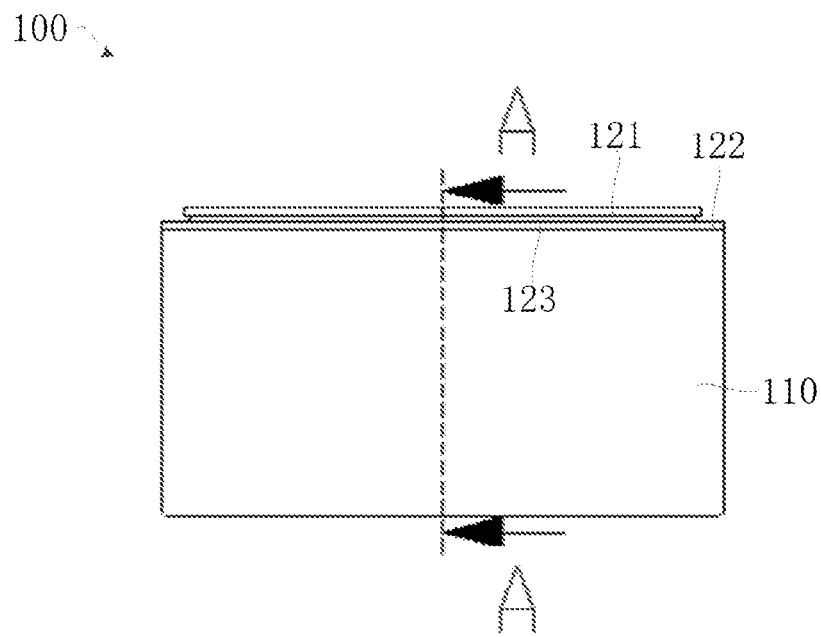
FIG. 4 is another schematic internal structure diagram of the battery provided by Embodiment 1 of the present disclosure.
Figure 5:
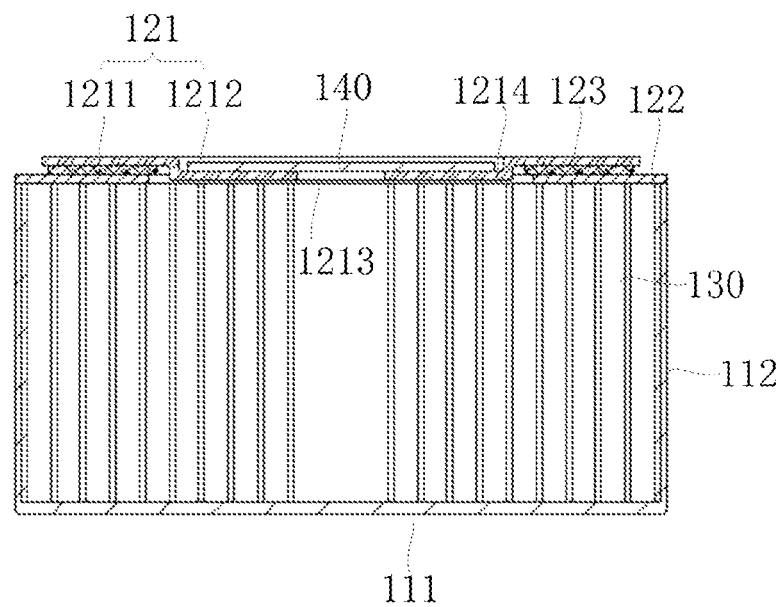
FIG. 5 is a schematic cross-section diagram of the battery in FIG. 4 along A-A line.
Figure 6:
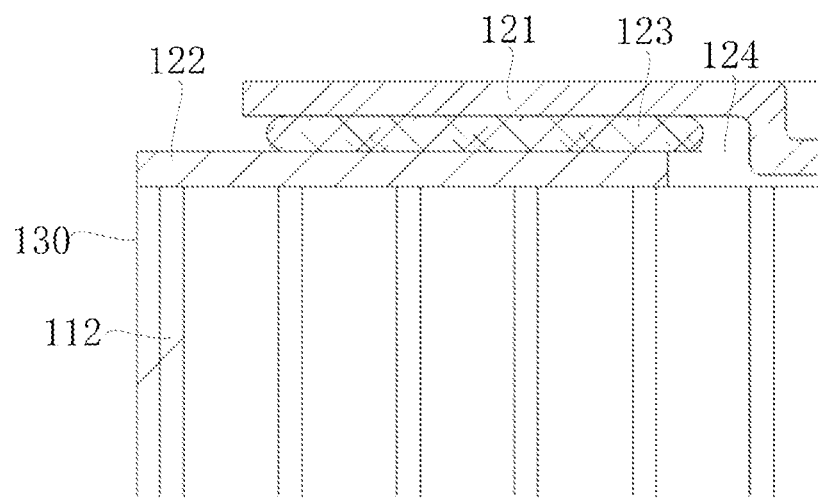
FIG. 6 is an enlarged view of the battery shown in FIG. 5.

FIG. 1 is a schematic structure diagram of a battery provided by Embodiment 1 of the present disclosure; FIG. 2 is another schematic structure diagram of the battery provided by Embodiment 1 of the present disclosure; FIG. 3 is a schematic structure exploded diagram of the battery provided by Embodiment 1 of the present disclosure; FIG. 4 is another schematic internal structure diagram of the battery provided by Embodiment 1 of the present disclosure;

FIG. 5 is a schematic cross-section diagram of the battery in FIG. 4 along A-A line; FIG. 6 is an enlarged view of the battery shown in FIG. 5.

As shown in FIGS. 1-2, a battery 100 provided by the embodiment of the present disclosure may include a shell 110, a cover assembly 120 and a coiled core assembly 130, where the coiled core assembly 130 is located inside the shell 110, the shell 110 is provided with an opening 1121, and the cover assembly 120 is sealingly covered on the opening 1121.

The material of the shell 110 can be stainless steel, or the material of the shell 110 can be stainless steel plated with nickel. A wall thickness of the shell 110 can be 0.1 mm-0.2 mm, for example, the wall thickness of the shell 110 can be 0.1 mm, 0.13 mm, 0.15 mm, 0.18 mm or 0.2 mm, etc. The embodiment of the present disclosure does not limit this.

In the present embodiment, as shown in FIGS. 3 and 4, the cover assembly 120 can include a conductive member 121, a top cover 122 and a sealing member 123, where the sealing member 123 can be located between the conductive member 121 and the top cover 122, and the conductive member 121 electrically contacts the coiled core assembly 130. It can be understood that, in the present embodiment, the conductive member 121, the top cover 122 and the sealing member 123 can all be annular structures as shown in FIG. 3.

Exemplarily, in the present embodiment, the sealing member 123 may have a first through hole 1231 and the top cover 122 may have a second through hole 1221.

In one possible implementation, the conductive member 121, the top cover 122, and the sealing member 123 can be connected by thermal-press lamination bonding to form the cover assembly 120.

Specifically, in an actual producing process, a thermal lamination machine can be used to preform thermal-press bonding on the conductive member 121, the top cover 122 and the sealing member 123. Where an upper sealing head and a lower sealing head of the thermal lamination machine can be preheated to 100° C. Then the top cover 122, the sealing member 123, and the conductive member121 are sequentially and coaxially placed on the lower sealing head in a position to be thermal-pressed for lamination. Then, the upper sealing head is pressed down, and the upper sealing head and the lower sealing head are heated to 160° C., maintaining for 3 minutes to prepare the cover assembly 120.

In addition, it can be understood that the conductive member 121 may have a boss (for example, first convex portion 1212 in FIG. 5 or second convex portion 1216 in FIG. 11) on its surface facing the coiled core assembly 130, and the boss passes through the first through hole 1231 and the second through hole 1221 to electrically contact the coiled core assembly 130.

In some embodiments, the material of the top cover 122 may be stainless steel, or the material of the top cover 122 may be stainless steel plated with nickel.

The sealing member 123 may be a sealing insulation rubber or the like, and the sealing member 123 having the first through hole 1231 may be a sealing insulation rubber ring. For example, the material of the sealing member 123 can be Polypropylene (PP) adhesive. PP adhesive is easy to be molded, is odorless, and has low density, it has excellent strength, rigidity, hardness and heat resistance, and it also has good electrical property and high-frequency insulation, and is unaffected by humidity.

It should be noted that in the present embodiment, the difference between the outer diameter of the sealing member 123 and the diameter of the first through hole 1231 (i.e., the inner diameter of the sealing member 123) may be greater than or equal to 20 mm, for example, the difference between the outer diameter of the sealing member 123 and the diameter of the first through hole 1231 may be 20 mm, 21 mm, 22 mm, 23 mm or 24 mm, etc., the embodiment of the present disclosure does not limit this.

In the present embodiment, the thickness of the sealing member 123 (i.e., the dimension of the sealing member 123 along the axial direction of the battery 100) may be 0.05 mm to 0.20 mm, for example, the thickness of the sealing member 123 may be 0.05 mm, 0.1 mm, 0.15 mm or 0.2 mm, etc., and the embodiment of the present disclosure does not limit this.

In the present embodiment, as shown in FIGS. 5 and 6, the diameter of the first through hole 1231 on the sealing member 123 may be smaller than that of the second through hole 1221 on the top cover 122. In this way, one end of the sealing member 123 close to the boss is located in the gap 124 between the top cover 122 and the boss, so that the inner ring of the top cover 122 overflows with adhesive, which can improve the sealing performance between the top cover 122 and the boss and the sealing performance between the top cover 122 and the shell 110, thereby reducing the risk of electrolyte penetrating and corroding the top cover 122 and the conductive member 121 through the sealing gap or hole, and thus reducing the risk of sealing failure between the cover assembly 120 and the shell 110.

Therefore, the embodiment of the present disclosure can improve the overall sealing performance of the battery 100 and ensure the long-term sealing of the battery 100. In addition, the overflowed adhesive is located in the gap 124 between the top cover 122 and the boss, which can also improve the surface flatness and overall aesthetics of the battery 100.

In the present embodiment, a difference between the diameter of the first through hole 1231 on the sealing member 123 and the diameter of the second through hole 1221 on the top cover 122 may be 0.05-0.4 mm. For example, the difference between the diameter of the first through hole 1231 on the sealing member 123 and the diameter of the second through hole 1221 on the top cover 122 can be 0.05 mm, 0.1 mm, 0.15 mm, 0.2 mm, 0.25 mm, 0.3 mm, 0.35 mm or 0.4 mm, etc., the embodiment of the present disclosure does not limit this.

In the present embodiment, referring to FIG. 3, the shell 110 may include a bottom shell 111 and a side shell 112, where the bottom shell 111 is connected to the side shell 112, and the bottom shell 111 and the side shell 112 together form an accommodating cavity for accommodating the coiled core assembly 130 (not shown). Moreover, the opening 1121 is located at one end of the side shell 112 facing away from the bottom shell 111, and the top cover 122 is sealingly covered on the opening 1121, and the opening 1121 is communicated with the accommodating cavity.

Where, in some embodiments, the top cover 122 may be welded to an end of side shell 112 facing away from bottom shell 111 by means of laser welding so as to seal top cover 122 to the opening 1121. Specifically, the laser welding between the top cover 122 and the side shell 112 of the shell 110 can be done by the way of light-out-of-top welding, or the laser welding between the top cover 122 and the side shell 112 of the shell 110 can also be done by the way of side-circumference welding.

Light-out-of-top welding refers to the laser welding equipment can emit laser light from the top of the battery 100 (i.e. above the top cover 122) to achieve the welding connection between the top cover 122 and the side shell 112.

Side-circumference welding means that the laser welding equipment can emit a circle of laser light from the side of battery 100 (i.e. the sides of top cover 122 and side shell 112) along the periphery of battery 100 to achieve the welding connection between the top cover 122 and side shell 112.

It should be noted that when the top cover 122 and the side shell 112 of the shell 110 are welded using laser, a welding seam width can be 0.2 mm-0.5 mm, for example, the welding seam width can be 0.2 mm, 0.3 mm, 0.4 mm or 0.5 mm, etc., the embodiment of the present disclosure does not limit this.

In the present embodiment, as shown in FIG. 4, the outer diameter of the sealing member 123 may be smaller than the outer diameter of the conductive member 121. In FIG. 4, when looking down from the top of the battery 100, the sealing member 123 is not exposed to the conductive member 121, that is, the conductive member 121 completely covers or obscures the sealing member 123. In this way, when the top cover 122 and the side case 112 of the shell 110 are welded using laser in the manner of light-out-of-top welding, the laser welding equipment can emit laser light from the top of the battery 100 (that is, above the top cover 122) to achieve the welding connection between the top cover 122 and the side shell 112. The sealing member 123 will not be exposed to the conductive member 121, which can prevent the sealing member 123 from interfering with the welding between the top cover 122 and the side shell 112, reduce the risk of welding defects caused by adhesive overflow and greatly improve the welding performance between the top cover 122 and the side shell 112.

In the present embodiment, a difference between the outer diameter of the sealing member 123 and the outer diameter of the conductive member 121 may be 0.05-0.4 mm. For example, the difference between the outer diameter of the sealing member 123 and the outer diameter of the conductive member 121 can be 0.05 mm, 0.1 mm, 0.15 mm, 0.2 mm, 0.25 mm, 0.3 mm, 0.35 mm or 0.4 mm, etc., and the embodiment of the present disclosure does not limit this.

It should be noted here that the numerical values and numerical ranges involved in the embodiment of the present disclosure are approximate values, which may have a certain range of errors due to the influence of the manufacturing process, and the error can be ignored by the skilled in the field.

In the present embodiment, as shown in FIG. 5, the conductive member 121 can include a first flat plate portion 1211 and a first convex portion 1212, where the first convex portion 1212 is connected with the first flat plate portion 1211, and the first convex portion 1212 can be provided with a third through hole 1213 as a liquid injection hole, the liquid injection hole is communicated with the accommodating cavity, and the first convex portion 1212 is served as a boss.

In the present embodiment, a concave portion 1214 can be formed on the surface of the first convex portion 1212 facing away from the coiled core assembly 130, and the battery 100 can further include a blocking member 140 (see FIGS. 1 to 3), where the blocking member 140 is arranged in the concave portion 1214 and used to block the third through hole 1213. The blocking member 140 can be, for example, a sealing nail.

Here, the producing process of the battery 100 is introduced: first, the coiled core assembly 130 is placed in the accommodating cavity of the shell 110, and then, the cover assembly 120 is sealingly covered on the opening 1121 of the shell 110 to realize the assembling of the battery 100; then, the assembled battery 100 is subjected to the baking process and bakes for 8-12 hours, and the moisture value is controlled to be less than 150 PPM, so as to prevent the moisture in the battery 100 from adversely affecting the subsequent liquid injection process.

After passing the moisture test, the battery 100 will be subjected to the liquid injection procedure for automatic liquid injection. Specifically, a liquid injection cup in the liquid injection machine is matched with the liquid injection hole (i.e., the third through hole 1213) of the battery 100, and the sealing test on the battery 100 is conducted at vacuum of 95 Kpa and pressure maintenance of 10 seconds, then the qualified samples will be injected with liquid, specifically, 0.15-0.21 g of electrolyte will be injected, then a loop of evacuation-pressure maintaining-vacuum breaking is executed for 3 times.

After the liquid injection is finished, the qualified samples which have been weighed are subjected to the welding procedure, the residual electrolyte near the liquid injection hole is wiped off, and the welding area is cleaned by laser light to remove the electrolyte. Then, the blocking member 140 (for example, sealing nail) is placed in the concave portion 1214, and the sealing is performed by laser welding. Finally, the batteries 100 are subjected to the helium inspection station for sealing inspection, and the qualified samples which have been inspected are subjected to the formation (charging and discharging test of the battery 100), sorting (sorting the batteries 100 with different capacities), and OCV (testing the voltage drop of the battery 100 per unit time) sequentially, and then the qualified samples are subjected to assembling and welding, that is, a plurality of batteries 100 are welded and assembled to form a battery pack.

In the battery 100 provided by the embodiment of the present disclosure, the cover assembly 120 of the battery 100 includes a conductive member 121, a top cover 122 and a sealing member 123, the sealing member 123 is located between the conductive member 121 and the top cover 122, and the conductive member 121 electrically contacts the coiled core assembly 130. The sealing member 123 has a first through hole 1231, and the top cover 122 has a second through hole 1221, and the diameter of the first through hole 1231 on the sealing member 123 is smaller than that of the second through hole 1221 on the top cover 122.

In this way, one end of the sealing member 123 close to the boss is located in the gap 124 between the top cover 122 and the boss, so that the inner ring of the top cover 122 overflows with adhesive, which can improve the sealing performance between the top cover 122 and the boss and the sealing performance between the top cover 122 and the shell 110, thereby reducing the risk of electrolyte penetrating and corroding the top cover 122 and the conductive member 121 through the sealing gap or hole, and thus reducing the risk of sealing failure between the cover assembly 120 and the shell 110. Therefore, the embodiment of the present disclosure can improve the overall sealing of the battery 100. In addition, the overflowed adhesive is located in the gap 124 between the top cover 122 and the boss, which can also improve the surface flatness and overall aesthetics of the battery 100.

Embodiment 2

Figure 7:
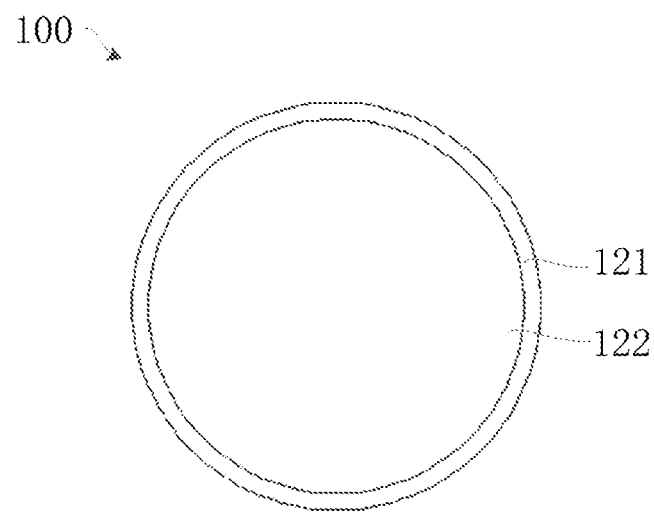
FIG. 7 is a schematic structure diagram of the battery provided by Embodiment 2 of the present disclosure.
Figure 8:
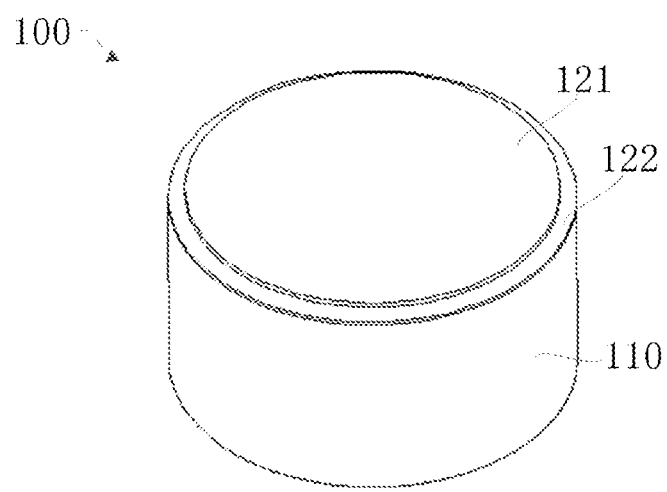
FIG. 8 is another schematic structure diagram of the battery provided by Embodiment 2 of the present disclosure.
Figure 9:
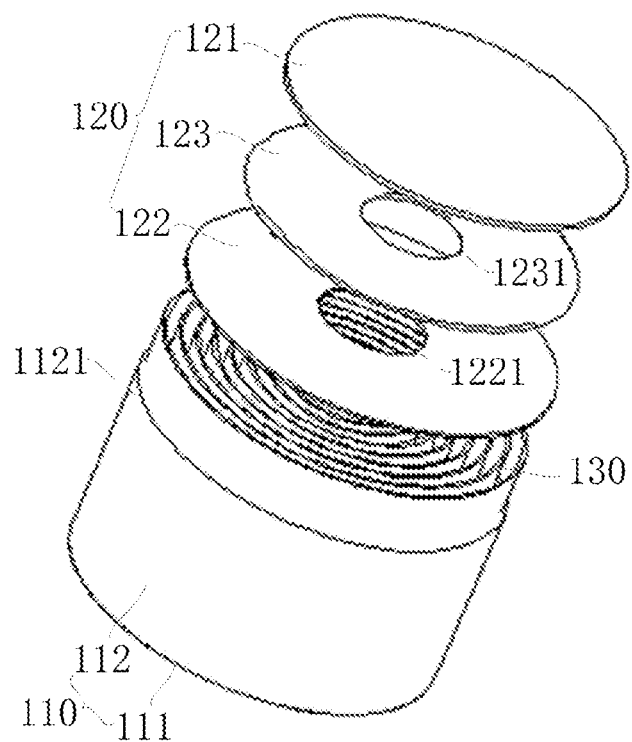
FIG. 9 is a schematic structure exploded diagram of the battery provided by Embodiment 2 of the present disclosure.

FIG. 7 is a schematic structure diagram of a battery 100 provided by Embodiment 2 of the present disclosure. FIG. 8 is another schematic structure diagram of the battery 100 provided by Embodiment 2 of the present disclosure. FIG. 9 is a schematic structure exploded diagram of the battery 100 provided by Embodiment 2 of the present disclosure. FIG.

Figure 10:
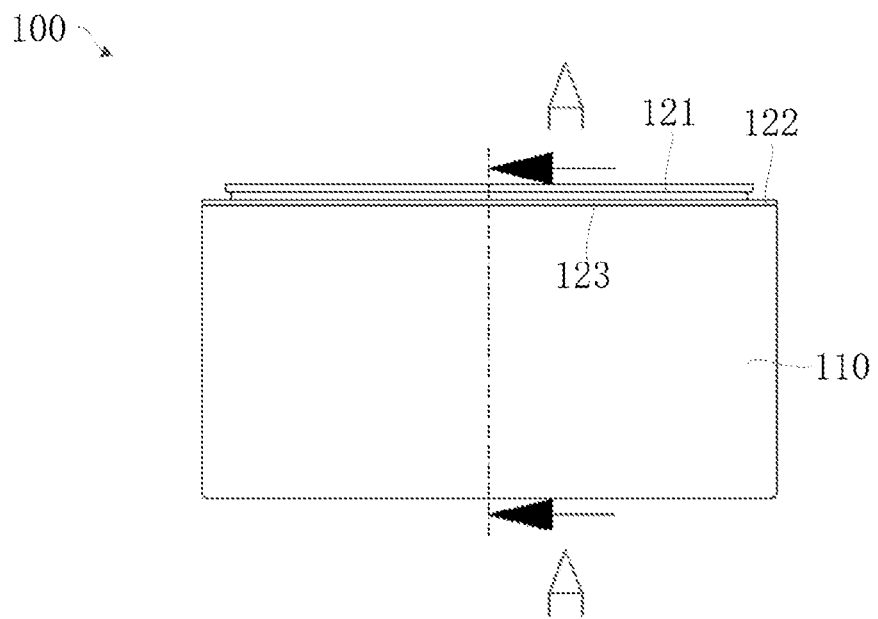
FIG. 10 is another schematic internal structure diagram of the battery provided by Embodiment 2 of the present disclosure.
Figure 11:
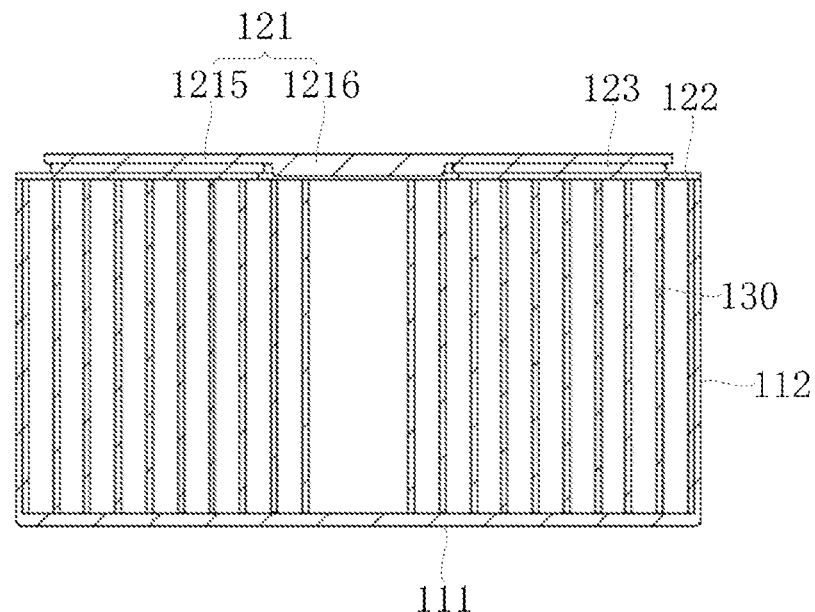
FIG. 11 is a schematic cross-section diagram of the battery in FIG. 10 along A-A line.
Figure 12:
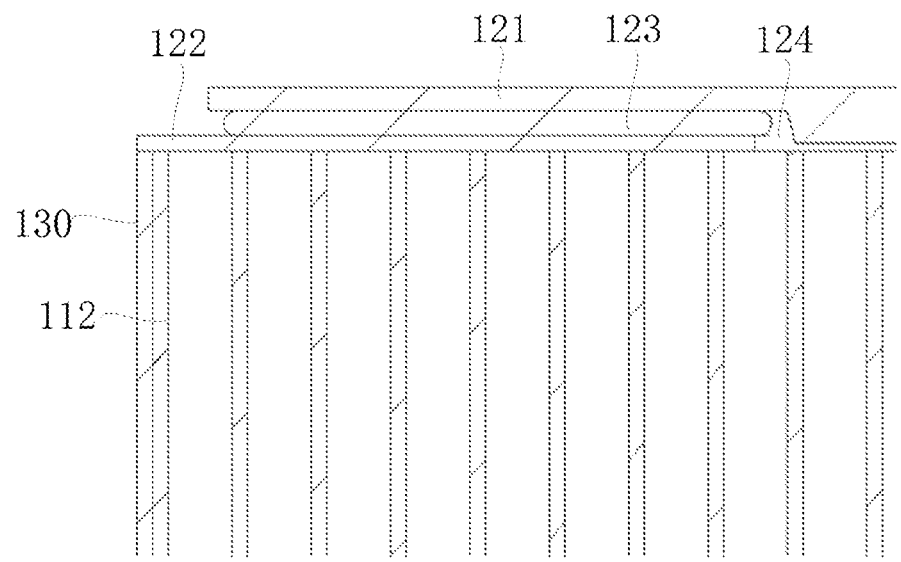
FIG. 12 is an enlarged view of the battery shown in FIG. 11.

10 is another schematic internal structure diagram 100 provided by Embodiment 2 of the present disclosure. FIG. 11 is a schematic cross-section diagram of the battery 100 in FIG. 10 along the A-A line. FIG. 11 is a schematic cross-section diagram of the battery 100 in FIG. 10 along A-A line. FIG. 12 is an enlarged view of the battery 100 shown in FIG. 11.

Different from Embodiment 1, as shown in FIGS. 7-10, the structure of the conductive member 121 in the embodiment of the present disclosure is different. Specifically, as shown in FIGS. 11 and 12, the conductive member 121 may include a second flat plate portion 1215 and a second convex portion 1216, where the second flat plate portion 1215 is connected to the second convex portion 1216, and the second convex portion 1216 serves as a boss.

In this way, compared with Embodiment 1, the present embodiment of the present disclosure eliminates the third through hole 1213 as the liquid injection hole, and has more simple structural design of the conductive member 121, which can reduce the material cost, thereby simplifying the overall structure of the battery 100 and reducing the overall material cost of the battery 100. Meanwhile, the surface flatness and overall aesthetics of the battery 100 can be improved.

Other technical features are the same as those of Embodiment 1, and can achieve the same technical effect, which will not be repeated here.

The electronic device provided by the embodiment of the present disclosure includes an electronic device body and a battery 100 for supplying electric energy to the electronic device body, where the cover assembly 120 of the battery 100 can comprise a conductive member 121, a top cover 122 and a sealing member 123, the sealing member 123 is located between the conductive member 121 and the top cover 122, and the conductive member 121 electrically contacts the coiled core assembly 130. The sealing member 123 has a first through hole 1231, and the top cover 122 has a second through hole 1221, and the diameter of the first through hole 1231 on the sealing member 123 is smaller than that of the second through hole 1221 on the top cover 122.

In this way, one end of the sealing member 123 close to the boss is located in the gap 124 between the top cover 122 and the boss, so that the inner ring of the top cover 122 overflows with adhesive, which can improve the sealing performance between the top cover 122 and the boss and the sealing performance between the top cover 122 and the shell 110, thereby reducing the risk of electrolyte penetrating and corroding the top cover 122 and the conductive member 121 through the sealing gap or hole, and thus reducing the risk of sealing failure between the cover assembly 120 and the shell 110. Therefore, the embodiment of the present disclosure can improve the overall sealing performance of the battery 100. In addition, the overflowed adhesive is located in the gap 124 between the top cover 122 and the boss, which can also improve the surface flatness and overall aesthetics of the battery 100.

Embodiment 3

The embodiment of the present disclosure also provides an electronic device, which may include an electronic device body and the battery 100 provided in Embodiment 1 or Embodiment 2, where the battery 100 provides electric energy for the electronic device body.

Where the electronic device body may be a wearable electronic device or other electronic products, or a medical electronic device used in medical treatment, etc., the present embodiment does not limit this.

Where, the structure and working principle of the battery 100 have been described in detail in Embodiment 1 and Embodiment 2, and will not be repeated here.

The electronic device provided by the embodiment of the present disclosure includes an electronic device body and a battery 100 for supplying electric energy to the electronic device body, where the cover assembly 120 of the battery 100 can include a conductive member 121, a top cover 122 and a sealing member 123, the sealing member 123 is located between the conductive member 121 and the top cover 122. The conductive member 121 has a boss on its surface facing the coiled core assembly 130, the sealing member 123 has a first through hole 1231, the top cover 122 has a second through hole 1221, and the boss passes through the first through hole 1231 and the second through hole 1221 to electrically contact the coiled core assembly 130. Moreover, the diameter of the first through hole 1231 on the sealing member 123 is smaller than that of the second through hole 1221 on the top cover 122.

In this way, one end of the sealing member 123 close to the boss is located in the gap 124 between the top cover 122 and the boss, so that the inner ring of the top cover 122 overflows with adhesive, which can improve the sealing performance between the top cover 122 and the boss and the sealing performance between the top cover 122 and the shell 110, thereby reducing the risk of electrolyte penetrating and corroding the top cover 122 and the conductive member 121 through the sealing gap or hole, and thus reducing the risk of sealing failure between the cover assembly 120 and the shell 110. Therefore, the embodiment of the present disclosure can improve the overall sealing performance of the battery 100. In addition, the overflowed adhesive is located in the gap 124 between the top cover 122 and the boss, which can also improve the surface flatness and overall aesthetics of the battery 100.

In the present specification, the embodiments or implementations are described in a progressive way, and the differences between each embodiment and other embodiments are highlighted, so the same and similar parts of the embodiments can be referred to each other.

In the description of the present specification, description with reference to the terms "one embodiment", "some embodiments", "schematic embodiments", "example", "specific example" or "some examples" or the like means that the specific features, structures, materials or characteristics described in connection with the embodiments or examples are included in at least one embodiment or example of the present disclosure. In the present specification, the schematic expressions of the above terms do not necessarily refer to the same embodiment or example. Furthermore, the specific features, structures, materials or characteristics described may be combined in any one or more embodiments or examples in a suitable manner.

Finally, it should be explained that the above embodiments are only used to illustrate the technical solution of the present disclosure, but not to limit it. Although the disclosure has been explained in detail with reference to the above embodiments, those ordinary skilled in the art should understand that they can still modify the technical solution described in the above embodiments, or equivalently replace some or all of the technical features therein, and these modifications or substitutions do not make the essence of the corresponding technical solution deviate from the scope of the technical solutions of the above embodiments.

What is claimed is:

1. A battery, at least comprising:
a shell, a cover assembly and a coiled core assembly located inside the shell;
the shell is provided with an opening, and the cover assembly sealingly covers the opening;
the cover assembly comprises a conductive member, a top cover and a sealing member between the conductive member and the top cover; the conductive member electrically contacts the coiled core assembly;
the sealing member is provided with a first through hole, the top cover is provided with a second through hole, and a diameter of the first through hole is smaller than a diameter of the second through hole;
an outer diameter of the sealing member is smaller than an outer diameter of the conductive member.

2. The battery according to claim 1, wherein a surface of the conductive member facing the coiled core assembly has a boss, and the boss passes through the first through hole and the second through hole to electrically contact the coiled core assembly.

3. The battery according to claim 2, wherein the shell comprises a bottom shell and a side shell connected with the bottom shell;
the bottom shell and the side shell form an accommodating cavity for accommodating the coiled core assembly, and the opening is communicated with the accommodating cavity; and
the opening is located at an end of the side shell facing away from the bottom shell, and the top cover sealingly covers the opening.

4. The battery according to claim 3, wherein the conductive member comprises a first flat plate portion and a first convex portion connected with the first flat plate portion;
the first convex portion is provided with a third through hole, and the third through hole is communicated with the accommodating cavity;
wherein the first convex portion is used as the boss.

5. The battery according to claim 4, wherein a concave portion is formed on a surface of the first convex portion facing away from the coiled core assembly;
the battery further comprises a blocking member; the blocking member is arranged in the concave portion and blocks the third through hole.

6. The battery according to claim 5, wherein a difference between the diameter of the first through hole and the diameter of the second through hole is 0.05-0.4 mm.

7. The battery according to claim 4, wherein a difference between the diameter of the first through hole and the diameter of the second through hole is 0.05-0.4 mm.

8. The battery according to claim 3, wherein a difference between the diameter of the first through hole and the diameter of the second through hole is 0.05-0.4 mm.

9. The battery according to claim 3 wherein a difference between the outer diameter of the sealing member and the outer diameter of the conductive member is 0.05-0.4 mm;
a thickness of the sealing member is 0.05-0.20 mm; and
a difference between the outer diameter of the sealing member and the diameter of the first through hole is greater than or equal to 20 mm.

10. The battery according to claim 2, wherein the conductive member comprises a second flat plate portion and a second convex portion connected with the second flat plate portion;
wherein the second convex portion is used as the boss.

11. The battery according to claim 2, wherein one end of the sealing member close to the boss is located in a gap between the top cover and the boss.

12. The battery according to claim 1, wherein the conductive member completely covers the sealing member in an extending direction of the sealing member.

13. An electronic device, comprising an electronic device body and the battery according to claim 1;
wherein the battery provides electric energy for the electronic device body.

* * * * *